United States Patent
Komuro

(10) Patent No.: US 9,834,193 B2
(45) Date of Patent: Dec. 5, 2017

(54) VEHICLE CONTROL APPARATUS

(71) Applicant: SUBARU CORPORATION, Tokyo (JP)

(72) Inventor: Masaki Komuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/180,880

(22) Filed: Jun. 13, 2016

(65) Prior Publication Data

US 2016/0368474 A1     Dec. 22, 2016

(30) Foreign Application Priority Data

Jun. 18, 2015   (JP) ................................ 2015-122538

(51) Int. Cl.
*B60W 10/02*    (2006.01)
*B60W 10/06*    (2006.01)
(Continued)

(52) U.S. Cl.
CPC ............. *B60W 10/08* (2013.01); *B60K 6/387* (2013.01); *B60K 6/48* (2013.01); *B60K 6/543* (2013.01);
(Continued)

(58) Field of Classification Search
None
See application file for complete search history.

(56) References Cited

U.S. PATENT DOCUMENTS

| 2007/0080005 A1 | 4/2007 | Joe |
| 2008/0132378 A1* | 6/2008 | Bouchon ................. B60K 6/48 477/3 |

(Continued)

FOREIGN PATENT DOCUMENTS

| JP | 2004-162534 A | 6/2004 |
| JP | 2007-099141 A | 4/2007 |

(Continued)

OTHER PUBLICATIONS

Decision to Grant issued in corresponding Japanese Patent Application No. 2015-122538, dated Feb. 7, 2017.
Office Action issued in corresponding Japanese Patent Application No. 2015-122538, dated Oct. 18, 2016.

*Primary Examiner* — Edwin A Young
(74) *Attorney, Agent, or Firm* — McDermott Will & Emery LLP

(57) ABSTRACT

A vehicle control apparatus having an engine and an electric motor includes a clutch, a first travel controller, a second travel controller, and a motor controller. The clutch is disposed in a power transmission path that couples the engine and driving wheels to each other. The first travel controller executes a motor travel in which the driving wheels are driven by the electric motor in a state where the clutch is disengaged to decouple the engine from the driving wheels, and the engine is stopped. The second travel controller executes a cranking travel in which the clutch is engaged while a fuel injection of the engine is stopped in a state in which the motor travel is executed, and the engine is rotated during traveling. The motor controller increases an output torque of the electric motor when a travel mode switches from the motor travel to the cranking travel.

8 Claims, 8 Drawing Sheets

(51) Int. Cl.
  B60W 10/08 (2006.01)
  B60W 20/40 (2016.01)
  B60K 6/387 (2007.10)
  B60K 6/543 (2007.10)
  B60W 10/107 (2012.01)
  B60K 6/48 (2007.10)

(52) U.S. Cl.
  CPC ............ B60W 10/02 (2013.01); B60W 20/40 (2013.01); *B60K 2006/4825* (2013.01); *B60W 10/06* (2013.01); *B60W 10/107* (2013.01); *B60W 2710/02* (2013.01); *B60W 2710/083* (2013.01); *B60Y 2200/92* (2013.01); *B60Y 2300/51* (2013.01); *Y02T 10/6252* (2013.01); *Y02T 10/6286* (2013.01); *Y02T 10/7258* (2013.01)

(56) References Cited

U.S. PATENT DOCUMENTS

| | | |
|---|---|---|
| 2011/0165992 A1 | 7/2011 | Ueno et al. |
| 2011/0174559 A1 | 7/2011 | Saito et al. |
| 2012/0309587 A1* | 12/2012 | Nozaki .................... B60K 6/48 477/5 |
| 2013/0296123 A1* | 11/2013 | Doering ................ B60W 10/02 477/5 |
| 2015/0291171 A1 | 10/2015 | Kuroki et al. |

FOREIGN PATENT DOCUMENTS

| | | |
|---|---|---|
| JP | 2007-177870 A | 7/2007 |
| JP | 2009-208565 A | 9/2009 |
| JP | 2009-234566 A | 10/2009 |
| JP | 2009-298269 A | 12/2009 |
| WO | 2014/68719 A1 | 5/2014 |

* cited by examiner

VEHICLE CONTROL APPARATUS

CROSS-REFERENCE TO RELATED APPLICATIONS

The present application claims priority from Japanese Patent Application No. 2015-122538 filed on Jun. 18, 2015, the entire contents of which are hereby incorporated by reference.

BACKGROUND

1. Technical Field

The present invention relates to a vehicle control apparatus having an engine and an electric motor.

2. Related Art

For the purpose of suppressing a fuel consumption of an engine, a vehicle in which a clutch disposed between the engine and driving wheels is disengaged to stop the engine during traveling has been proposed (refer to International Publication (WO) No. 2014/68719). The vehicle disclosed in WO 2014/68719 executes coasting which stops a fuel supply while the clutch is engaged as the coasting which travels while stopping the engine.

In the vehicle of WO 2014/68719, although a pumping loss of the engine is reduced by cylinder deactivation, a fuel supply to the engine is stopped while the clutch is engaged. As described above, the mere stoppage of the fuel supply to the engine for the purpose of suppressing the fuel consumption of the engine causes the vehicle to be excessively decelerated.

SUMMARY OF THE INVENTION

It is desirable to suppress excessive deceleration of a vehicle.

An aspect of the present invention provides a vehicle control apparatus having an engine and an electric motor, which includes: a clutch that is disposed in a power transmission path that couples the engine and driving wheels; a first travel controller that executes a motor travel in which the driving wheels are driven by the electric motor in a state where the clutch is disengaged to decouple the engine from the driving wheels, and the engine is stopped; a second travel controller that executes a cranking travel in which the clutch is engaged while a fuel injection of the engine is stopped in a state in which the motor travel is executed, and the engine is rotated during traveling; and a motor controller that increases an output torque of the electric motor when a travel mode switches from the motor travel to the cranking travel.

DETAILED DESCRIPTION

Figure 1:
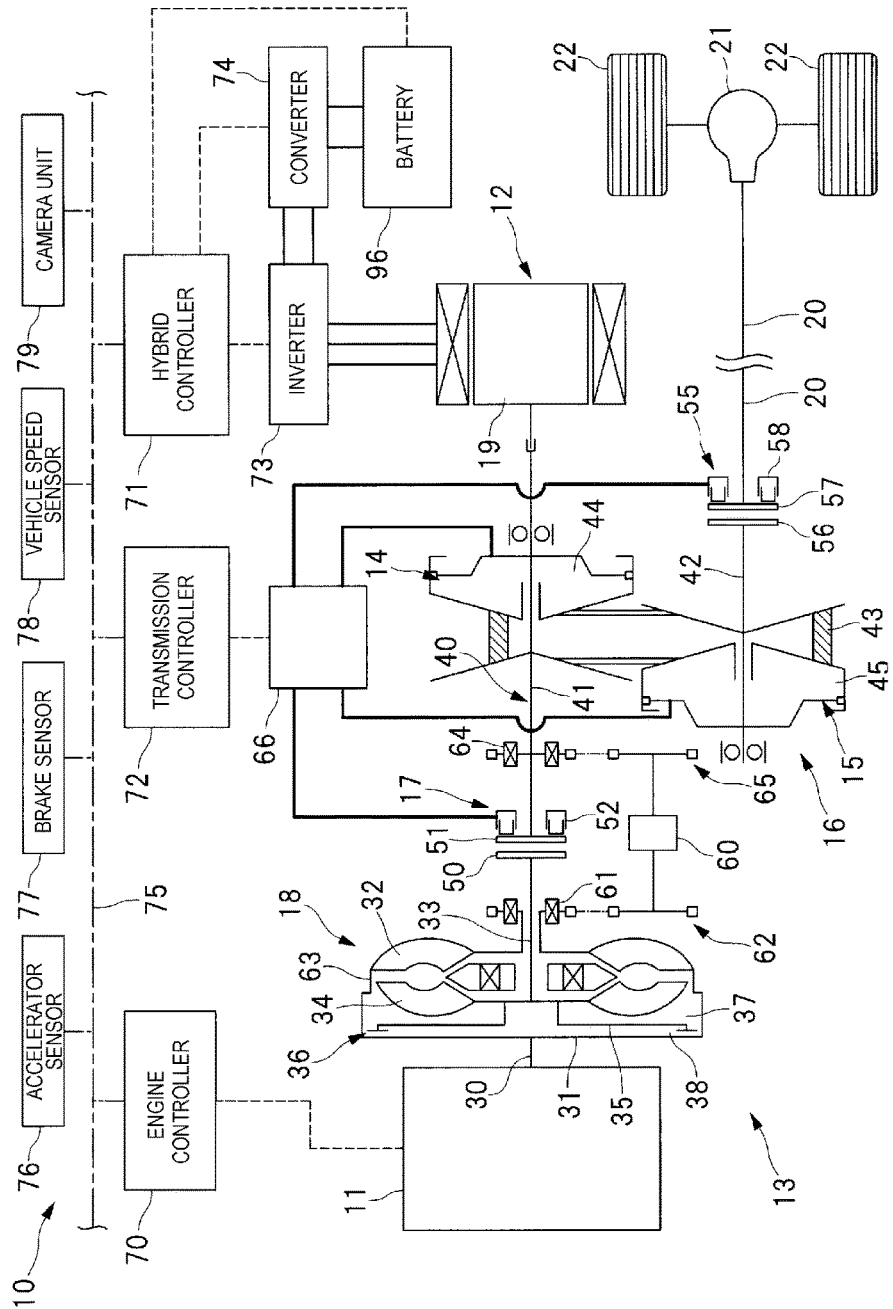
FIG. 1 is a schematic diagram illustrating a vehicle control apparatus according to an example of the present invention.

Hereinafter, an example of the present invention will be described with reference to the accompanying drawings in detail. FIG. 1 is a schematic diagram illustrating a vehicle control apparatus 10 according to an example of the present invention. As illustrated in FIG. 1, the vehicle control apparatus 10 includes a power unit 13 equipped with an engine 11 and a motor generator (electric motor) 12. The power unit includes a continuously variable transmission (transmission mechanism) 16 having a primary pulley 14 and a secondary pulley 15. One side of the primary pulley 14 is coupled with the engine 11 through an engine clutch 17 and a torque converter 18. The other side of the primary pulley 14 is coupled with a rotor 19 of the motor generator 12. The secondary pulley 15 is coupled with driving wheels 22 through a driving wheel output shaft 20 and a differential mechanism 21.

[Torque Converter]

The torque converter 18 includes a pump impeller 32 that is coupled to a crank shaft 30 through a front cover 31, and a turbine runner 34 that faces the pump impeller 32, and is coupled with a turbine shaft 33. The torque converter 18 includes a lock-up clutch 36 having a clutch plate 35. An interior of the torque converter 18 is partitioned into an apply chamber 37 and a release chamber 38 with a boundary of the clutch plate 35. A hydraulic pressure in the release chamber 38 is decreased by increasing a hydraulic pressure in the apply chamber 37, as a result of which the clutch plate 35 is pressed against the front cover 31, and the lock-up clutch 36 is switched to an engaged state. On the other hand, the hydraulic pressure in the apply chamber 37 is decreased by increasing the hydraulic pressure in the release chamber 38, as a result of which the clutch plate 35 is separated from the front cover 31, and the lock-up clutch 36 is switched to a disengaged state.

[Continuously Variable Transmission]

The continuously variable transmission 16 is disposed in a power transmission path 40 that couples the engine 11 to the driving wheels 22. The continuously variable transmission 16 includes the primary pulley 14 provided on a primary shaft 41 and the secondary pulley 15 provided on a secondary shaft 42. A drive chain 43 is wound on the primary pulley 14 and the secondary pulley 15, and transmits a power between the pulleys 14 and 15. A primary chamber 44 is provided in the primary pulley 14, and adjusts a pulley groove width. A secondary chamber 45 is provided in the secondary pulley 15, and adjusts the pulley groove width. The hydraulic pressure to be supplied to the secondary chamber 45 is controlled so as to adjust a clamping force of the drive chain 43 by the secondary pulley 15, and adjust a torque capacity of the continuously variable transmission 16. In addition, the hydraulic pressures to be supplied to the primary chamber 44 and the secondary chamber 45 are controlled so as to vary a winding diameter of the drive chain 43 while varying the pulley groove width. The power transmission path 40 that couples the engine 11 to the driving wheels 22 includes the torque converter 18, the turbine shaft 33, the primary shaft 41, the secondary shaft 42, the driving wheel output shaft 20, and the differential mechanism 21.

[Engine Clutch]

The engine clutch (clutch) 17 is provided between the torque converter 18 and the primary pulley 14. In other words, the engine clutch 17 for switching between the engaged state and the disengaged state is provided on the power transmission path 40 that couples the engine 11 to the driving wheels 22. The engine clutch 17 includes a clutch plate 50 that is coupled to the turbine shaft 33, and a clutch plate 51 that is coupled to the primary shaft 41. The engine clutch 17 includes a hydraulic actuator 52 to which a hydraulic oil is supplied. With an increase in the hydraulic pressure in the hydraulic actuator 52, the clutch plates 50 and 51 are engaged with each other, and the engine clutch 17 is switched to the engaged state. On the other hand, with a decrease in the hydraulic pressure in the hydraulic actuator 52, the engaged state of the clutch plates 50 and 51 is released, and the engine clutch 17 is switched to the disengaged state.

[Fuse Clutch]

A fuse clutch 55 is provided between the secondary pulley 15 and the driving wheels 22, and can adjust a fastening force, in other words, a torque capacity. The fuse clutch 55 includes a clutch plate 56 that is coupled to the secondary shaft 42, and a clutch plate 57 that is coupled to the driving wheel output shaft 20. The fuse clutch 55 includes a hydraulic actuator 58 to which the hydraulic oil is supplied. With an increase in the hydraulic pressure in the hydraulic actuator 58, the clutch plates 56 and 57 are engaged with each other, and the fuse clutch 55 is switched to a coupled state. On the other hand, with a decrease in the hydraulic pressure in the hydraulic actuator 58, the engaged state of the clutch plates 56 and 57 is released, and the fuse clutch 55 is switched to the disengaged state. The torque capacity of the fuse clutch 55 is controlled to be lower than the torque capacity of the continuously variable transmission 16. With this configuration, when a large torque is input to the continuously variable transmission 16, the fuse clutch 55 can be slipped ahead of the continuously variable transmission 16, thereby being capable of protecting the continuously variable transmission 16.

[Hydraulic Control System]

In order to supply the hydraulic oil to the torque converter 18, the continuously variable transmission 16, the engine clutch 17, and the fuse clutch 55, an oil pump 60 is provided in the power unit 13, and driven by the engine 11 or the primary shaft 41. The oil pump 60 is coupled with a pump shell 63 of the torque converter 18 through a chain mechanism 62 having a one-way clutch 61. The oil pump 60 is coupled with the primary shaft 41 through a chain mechanism 65 having a one-way clutch 64.

When the pump shell 63 is rotated faster than the primary shaft 41, a driving force is transmitted to the oil pump 60 from the pump shell 63 through the chain mechanism 62. In other words, when the engine 11 is driven, the oil pump 60 is driven by an engine power. On the other hand, when the pump shell 63 is rotated slower than the primary shaft 41, the driving force is transmitted to the oil pump 60 from the primary shaft 41 through the chain mechanism 65. In other words, even when the engine 11 is stopped as in a motor travel to be described later, the oil pump 60 is driven by the primary shaft 41 during a forward travel.

In addition, in order to control the hydraulic oil discharged from the oil pump 60, a valve body 66 is provided in the power unit 13, and includes multiple solenoid valves and oil passages. The hydraulic oil discharged from the oil pump 60 is supplied to the torque converter 18, the continuously variable transmission 16, the engine clutch 17, and the fuse clutch 55 through the valve body 66. Incidentally, from the viewpoint of ensuring a control hydraulic pressure, even during a low speed travel with the engine stop, or a backward travel with the engine stop, an electric oil pump not illustrated is provided in the power unit 13 in addition to the oil pump 60.

[Electronic Control System]

In order to control an operating state of the power unit 13, the vehicle control apparatus 10 includes multiple controllers 70 to 72. As the controllers, the engine controller 70 for controlling the engine 11 is provided, and the hybrid controller 71 for controlling the motor generator is provided. In addition, as the controller, the transmission controller 72 for controlling the continuously variable transmission 16, the engine clutch 17, the lock-up clutch 36, and the fuse clutch 55 is provided. The engine controller 70 outputs control signals to a throttle valve and an injector, and controls the operating state of the engine 11. The hybrid controller 71 outputs control signals to an inverter 73 and a converter 74, and controls an operating state of the motor generator 12. Further, the transmission controller 72 outputs a control signal to the valve body 66, and controls operating states of the continuously variable transmission 16, the engine clutch 17, the lock-up clutch 36, and the fuse clutch 55.

Each of those controllers 70 to 72 includes a microcomputer having a CPU, a ROM, and a RAM, and a driver circuit unit that generates control currents for various actuators. The respective controllers 70 to 72 are coupled to each other through a in-vehicle network 75 such as a CAN. The in-vehicle network 75 is coupled with an accelerator sensor 76 that detects an operating status of an accelerator pedal, a brake sensor 77 that detects an operating status of a brake pedal, a vehicle speed sensor 78 that detects a vehicle speed, and a camera unit 79 that images vehicle surroundings. As described above, various pieces of information indicative of a travel state and a travel environment of the vehicle is transmitted over the in-vehicle network 75.

[Travel Mode]

Figure 2A:
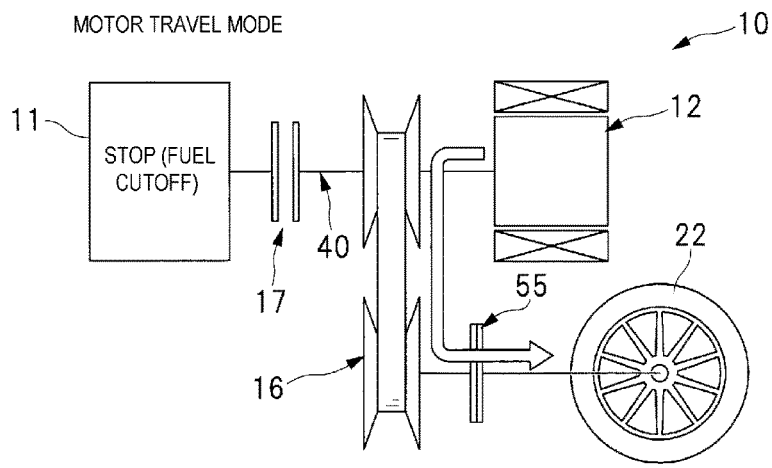
FIGS. 2A to 2C are schematic diagrams illustrating an example of travel modes provided in the vehicle control apparatus.
Figure 2B:
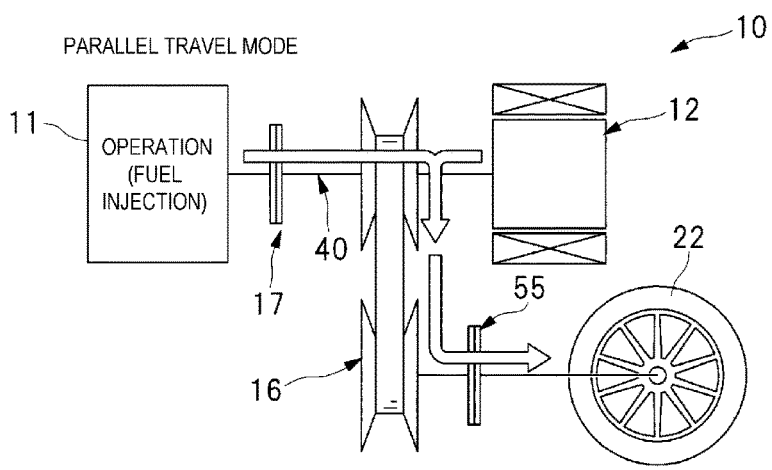
Figure 2C:
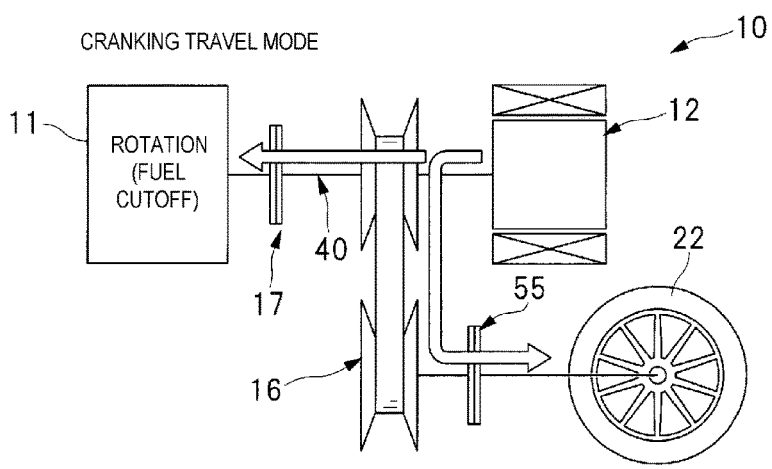

FIGS. 2A to 2C are schematic diagrams illustrating an example of travel modes provided in the vehicle control apparatus 10. In each of FIGS. 2A to 2C, an example of a power transmission status in each travel mode is indicated by hollow arrows. As illustrated in FIGS. 2A to 2C, the vehicle control apparatus 10 includes a motor travel mode, a parallel travel mode, and a cranking travel mode as the travel modes. The motor travel mode is a travel mode for executing a motor travel in which the driving wheels 22 are driven by the motor generator 12, and the parallel travel mode is a travel mode for executing a parallel travel in which the driving wheels 22 are driven by the engine 11 and the motor generator 12. The cranking travel mode is a travel mode for executing a cranking travel in which the engine clutch 17 is engaged to rotate the engine 11 while maintaining a fuel cutoff of the engine 11.

As illustrated in FIG. 2A, when the motor travel mode is executed, the engine clutch 17 is controlled to be kept in the disengaged state, and the engine 11 is decoupled from the driving wheels 22. With that configuration, the driving wheels 22 can be driven by the motor generator 12 in a state where the engine 11 is stopped. As illustrated in FIG. 2B, when the parallel travel mode is executed, the engine clutch 17 is controlled to be kept in the engaged state, and the engine is coupled with the driving wheels 22. With that configuration, not only the driving wheels 22 are driven by the motor generator 12, but also the driving wheels 22 can be driven by the engine 11. Further, as illustrated in FIG. 2C, when the cranking travel mode is executed, the engine clutch 17 is switched from the disengaged state to the engaged state while maintaining the fuel cutoff of the engine 11 in the motor travel. With that configuration, the engine 11 can be rotated during traveling while a fuel injection of the engine 11 remains stopped, in other words, while the fuel injection from an injector not illustrated remains stopped.

Any one of the motor travel mode, the parallel travel mode, and the cranking travel mode described above is set on the basis of a vehicle state such as a vehicle speed or an accelerator position. For example, in the case of a low vehicle speed travel or a low accelerator position, the motor travel mode is set as the travel mode whereas in the case of a high vehicle speed travel or a high accelerator position, the parallel travel mode is set as the travel mode. In the motor travel mode with the engine stop, when an engine rotation is required due to a short negative pressure of a vacuum booster 83 to be described later, the cranking travel mode in which the engine clutch 17 is engaged while the fuel supply to the engine 11 remains stopped, and the engine 11 is rotated is set. With the implementation of the cranking travel mode, the engine 11 can be rotated while the fuel injection remains stopped, and the fuel consumption of the engine 11 can be suppressed.

The switching of the travel mode is controlled by the various controllers 70 to 72 described above. In other words, in one implementation, the engine controller 70, the hybrid controller 71, and the transmission controller 72 function as a first travel controller that executes the motor travel, and also function as a second travel controller that executes the cranking travel. In one implementation, the hybrid controller 71 functions as a motor controller that controls the motor generator 12. In one implementation, the transmission controller 72 functions as a transmission controller that controls the continuously variable transmission 16.

[Engine Peripheral Equipment]

Figure 3:
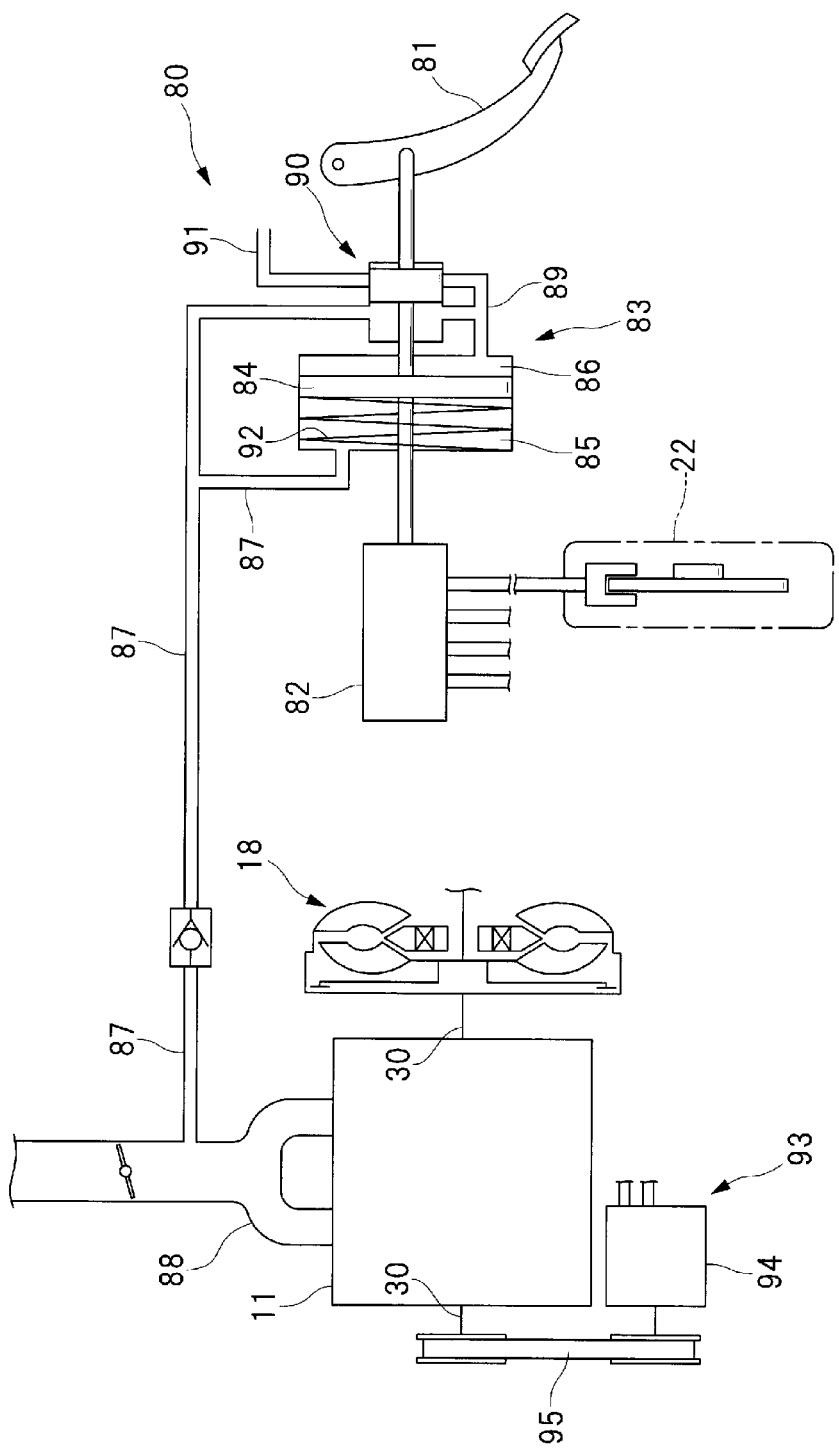
FIG. 3 is a schematic diagram illustrating peripheral equipment coupled with an engine.

As described above, the cranking travel mode is executed on the basis of the short negative pressure of the vacuum booster 83. FIG. 3 is a schematic diagram illustrating peripheral equipment coupled with the engine 11. As illustrated in FIG. 3, the vacuum booster 83 is provided between a brake pedal 81 and a master cylinder 82 configuring a brake device 80, and increases a braking operation force. The vacuum booster 83 is partitioned into a negative pressure chamber 85 and an atmospheric pressure chamber 86 with a power piston 84 as a boundary, and the negative pressure chamber 85 of the vacuum booster 83 is coupled with an intake pipe 88 of the engine 11 through a negative pressure pipe 87. The atmospheric pressure chamber 86 of the vacuum booster 83 is coupled with a supply and discharge pipe 89, and the supply and discharge pipe 89 is coupled with an open pipe 91 and the negative pressure pipe 87 through a control valve 90.

When the brake pedal 81 is depressed by a driver, because the open pipe 91 and the supply and discharge pipe 89 communicate with each other through the control valve 90, an atmospheric pressure is introduced into the atmospheric pressure chamber 86 of the vacuum booster 83 from the open pipe 91. Because the power piston 84 is urged due to a pressure difference between the negative pressure chamber 85 and the atmospheric pressure chamber 86, a driver's braking operation is assisted by the power piston 84. On the other hand, when the depression of the brake pedal 81 by the driver is released, because the negative pressure pipe 87 and the supply and discharge pipe 89 communicate with each other through the control valve 90, the pressure difference between the negative pressure chamber 85 and the atmospheric pressure chamber 86 is eliminated. With that configuration, the power piston 84 is pushed back by a return spring 92.

As described above, an air flows into the negative pressure chamber 85 of the vacuum booster 83 from the atmospheric pressure chamber 86 every time the depression of the brake pedal 81 is released. For that reason, in the motor travel in which the engine 11 is stopped, a booster negative pressure of the negative pressure chamber 85 is decreased every time the braking operation is repeated. In other words, in the motor travel mode, a pressure in the negative pressure chamber 85 increases every time the braking operation is repeated. Since the decrease in the booster negative pressure in the vacuum booster 83 as described above causes a reduction in the braking operation force, there is a need to rotate the engine 11 by the cranking travel, to thereby ensure the booster negative pressure in the vacuum booster 83.

Without being limited to the vacuum booster 83 described above, there is, for example, a compressor 94 configuring an air conditioner 93 as peripheral equipment requiring the engine rotation. As illustrated in FIG. 3, the crank shaft 30 of the engine 11 is coupled with the compressor 94 through a pulley mechanism 95. The compressor 94 is driven to compress a refrigerant gas with the results that a refrigerant can be circulated in a refrigeration cycle not illustrated, and a vehicle interior can be cooled by the air conditioner 93. In other words, in the motor travel in which the engine 11 is stopped, since the compressor 94 driven by the engine 11 is also stopped, it is assumed that a vehicle interior temperature increases relative to a set temperature of the air conditioner 93. When the vehicle interior temperature increases relative to the set temperature as described above, there is a need to rotate the engine 11 by the cranking travel, to thereby drive the compressor 94 and decrease the vehicle interior temperature.

[Outline of Flowchart]

Figure 4:
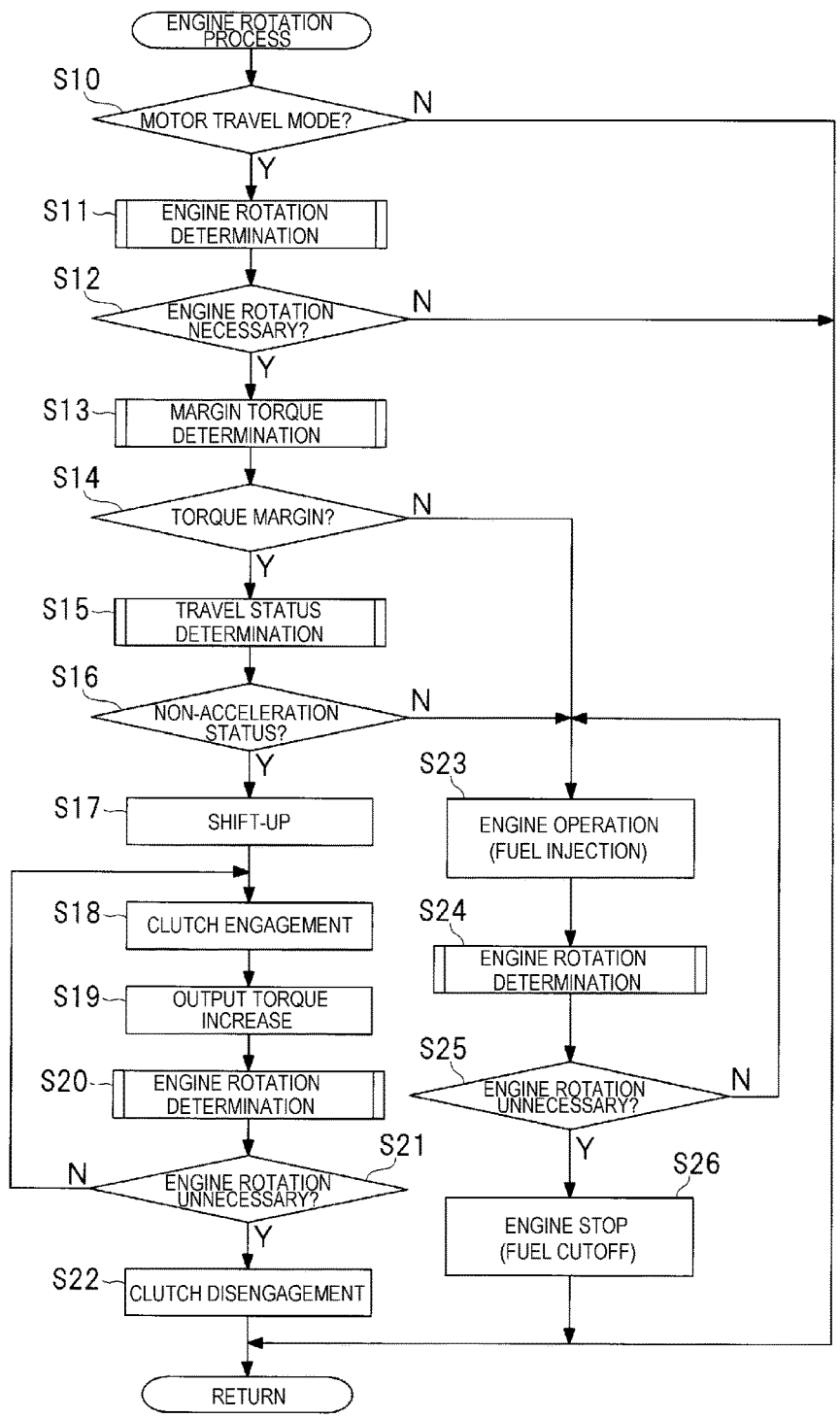
FIG. 4 is a flowchart illustrating an example of an engine rotation process.
Figure 5:
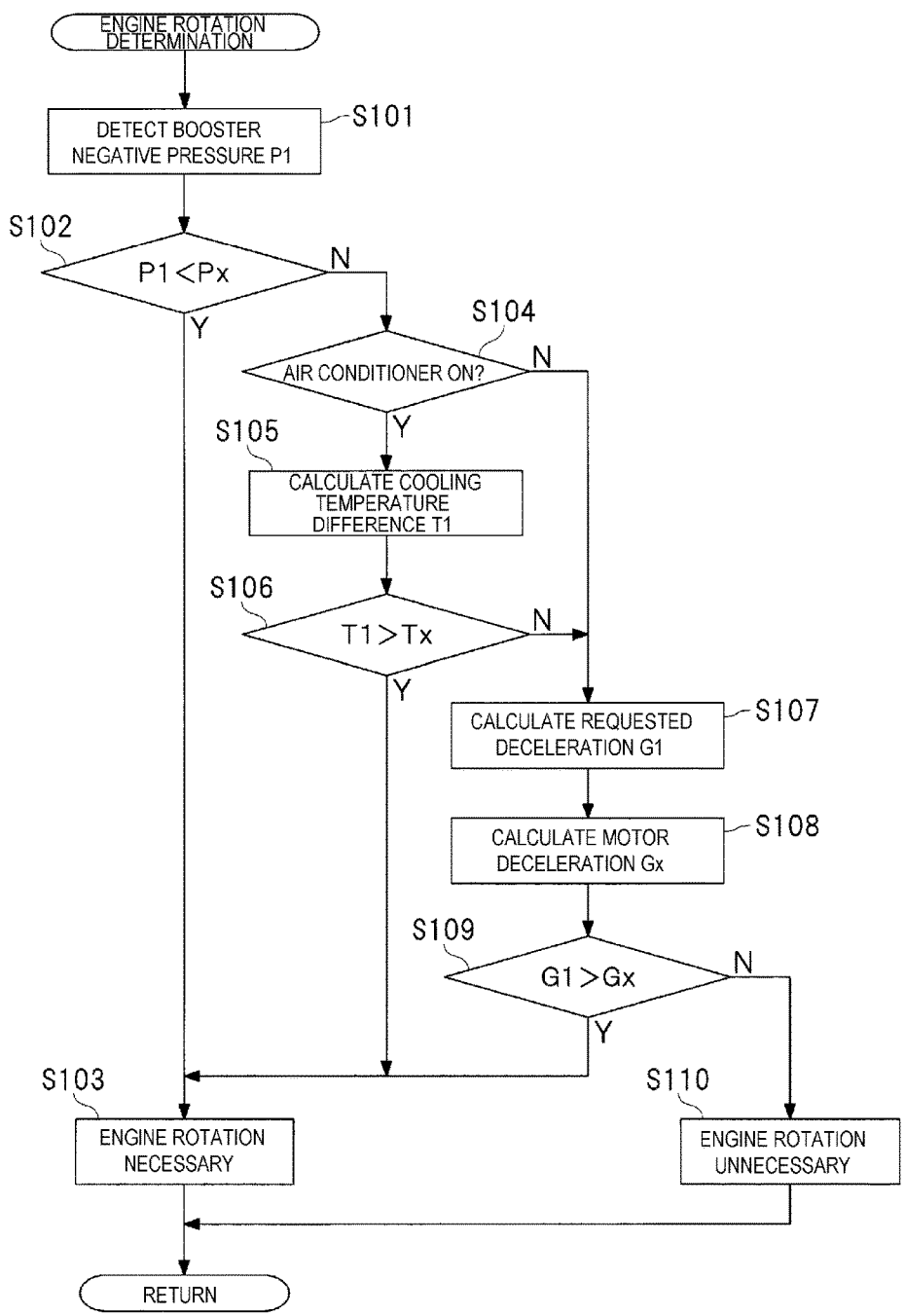
FIG. 5 is a flowchart illustrating an example of an engine rotation determination to be executed in the engine rotation process.
Figure 6:
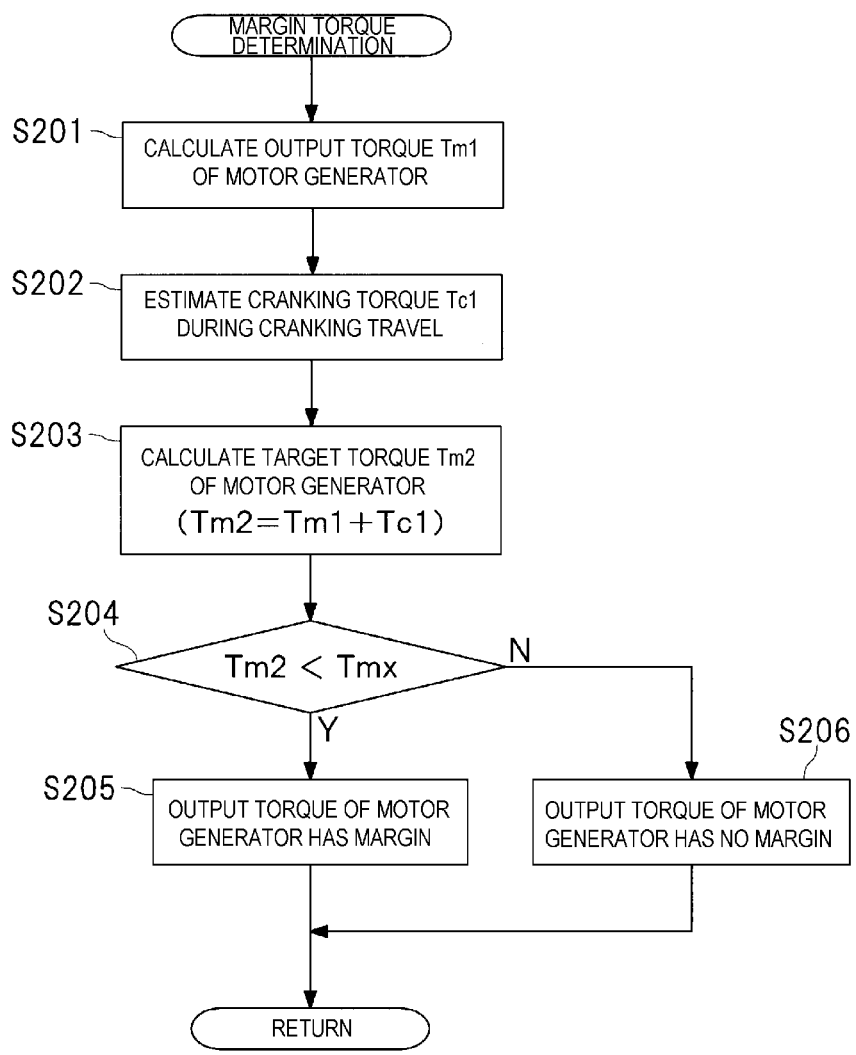
FIG. 6 is a flowchart illustrating an example of a margin torque determination to be executed in the engine rotation process.
Figure 7:
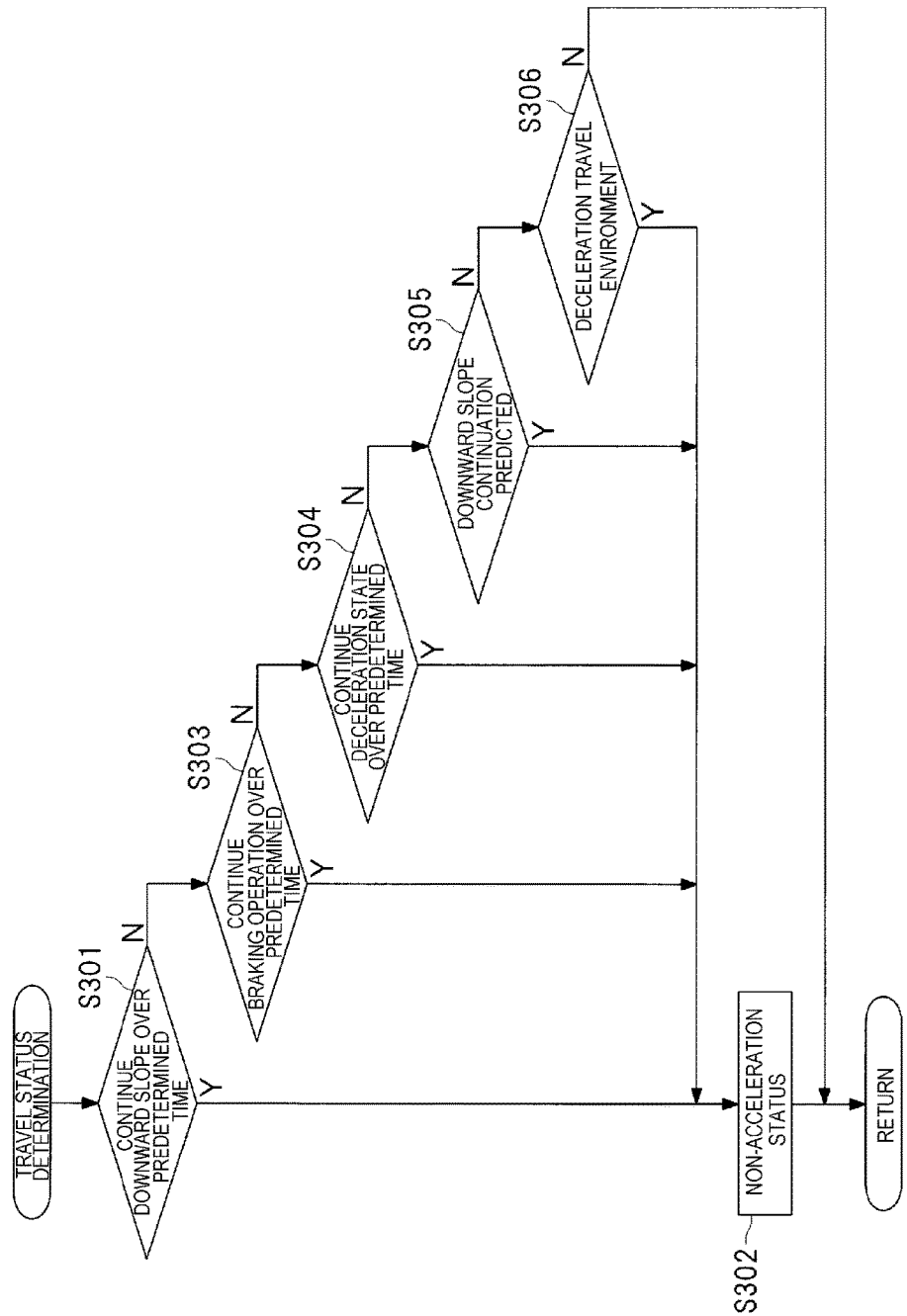
FIG. 7 is a flowchart illustrating an example of a travel status determination to be executed in the engine rotation process.

Then, a procedure when the engine rotation is required on the basis of a reduction in the booster negative pressure, in other words, a procedure for executing an engine rotation process during the motor travel will be described. FIG. 4 is a flowchart illustrating an example of an engine rotation process; FIG. 5 is a flowchart illustrating an example of an engine rotation determination to be executed in the engine rotation process; FIG. 6 is a flowchart illustrating an example of a margin torque determination to be executed in the engine rotation process; FIG. 7 is a flowchart illustrating an example of a travel status determination to be executed in the engine rotation process; and in the following description, the engine rotation process during the motor travel will be described subsequent to a description of an engine rotation determination, a margin torque determination, and a travel status determination. The engine rotation process, the engine rotation determination, the margin torque determination, and the travel status determination are executed by the engine controller 70, the hybrid controller 71, and the transmission controller 72.

[Engine Rotation Determination]

As illustrated in FIG. 5, in Step S101, a booster negative pressure P1 in the vacuum booster 83 is detected. In subsequent Step S102, it is determined whether the booster negative pressure P1 falls below a predetermined value Px, or not. If it is determined that the booster negative pressure P1 falls below the predetermined value Px in Step S102, in other words, if it is determined that the booster negative pressure P1 is short, because there is a need to ensure the booster negative pressure P1, the process proceeds to Step 103, and it is determined that the rotation of the engine 11 is necessary. The booster negative pressure P1 is a value obtained by subtracting the pressure in the negative pressure chamber 85 from the atmospheric pressure. The booster negative pressure P1 becomes smaller as the pressure in the negative pressure chamber 85 increases and comes closer to the atmospheric pressure. The booster negative pressure P1 becomes larger as the pressure in the negative pressure chamber 85 decreases and moves farther from the atmospheric pressure.

If it is determined that the booster negative pressure P1 exceeds the predetermined value Px in Step S102, in other words, if it is determined that the booster negative pressure P1 is ensured, the process proceeds to Step S104, and it is determined whether the air conditioner 93 is in an operating state, that is, the air conditioner is on, or not. If it is determined that the air conditioner 93 is operating in Step S104, the process proceeds to Step S105, and a cooling temperature difference T1 is calculated by subtracting the set temperature from the present vehicle interior temperature. Subsequently, the process proceeds to Step S106, and it is determined whether the cooling temperature difference T1 exceeds a predetermined value Tx, or not. If it is determined that the cooling temperature difference T1 exceeds the predetermined value Tx in Step S106, that is, if it is determined that the vehicle interior temperature is increasing, because there is a need to drive the compressor 94 and decrease the vehicle interior temperature, the process proceeds to Step S103, and it is determined that the rotation of the engine 11 is necessary.

If it is determined that the air conditioner 93 is in a stop state, that is, the air conditioner is off, in Step S104, or if it is determined that the cooling temperature difference T1 is equal to or less than the predetermined value Tx in Step S106, the process proceeds to S107, and a requested deceleration G1 of the driver is calculated on the basis of the depression of the brake pedal 81. For example, the requested deceleration G1 is set to be larger if the amount of depression of the brake pedal 81 is larger whereas the requested deceleration G1 is set to be smaller if the amount of depression of the brake pedal 81 is smaller. Further, the process proceeds to Step S108, and a motor deceleration Gx obtained by a regenerative braking of the motor generator 12 is calculated on the basis of a state of charge SOC of a battery 96. For example, if the state of charge SOC is lower, since a sufficient regenerative braking can be performed, the motor deceleration Gx is set to be larger. On the other hand, if the state of charge SOC is higher, since the sufficient regenerative braking is difficult, the motor deceleration Gx is set to be smaller. The flow proceeds to Step 109, and it is determined whether the requested deceleration G1 exceeds the motor deceleration Gx, or not. If it is determined that the requested deceleration G1 exceeds the motor deceleration Gx in Step S109, it is difficult to obtain the sufficient deceleration. Therefore, for the purpose of using an engine brake together, the process proceeds to Step S103, and it is determined that the rotation of the engine 11 is necessary. On the other hand, if it is determined that the requested deceleration G1 falls below the motor deceleration Gx in Step S109, the process proceeds to Step S110, and it is determined that the rotation of the engine 11 is unnecessary.

[Margin Torque Determination]

As illustrated in FIG. 6, an output torque Tm1 that is being output from the motor generator 12 is calculated in Step S201, and a cranking torque Tc1 that is generated during the cranking travel is estimated in subsequent Step S202. In the present specification, the cranking torque Tc1 represents a load torque of the engine 11 acting on the motor generator 12 and the driving wheels 22 when the engine clutch 17 is engaged to crank the engine 11. Because the cranking torque Tc1 is not transmitted beyond a torque capacity of the engine clutch 17, the torque capacity of the engine clutch 17 is employed as the cranking torque Tc1. Although the torque capacity of the engine clutch 17 is stored in the transmission controller 72, the torque capacity may be calculated on the basis of a hydraulic pressure of the engine clutch 17 without using data of the stored torque capacity. In Step S201 described above, when the output torque Tm1 is output to a powering side, the output torque Tm1 is calculated as a positive value, and when the output torque Tm1 is output to a regenerative side, the output torque Tm1 is calculated as a negative value.

Then, in Step S203, a target torque Tm2 of the motor generator 12 is calculated by adding the output torque Tm1 and the cranking torque Tc1 together. In other words, the target torque Tm2 of the motor generator 12 is calculated by adding the output torque Tm1 of the motor generator 12 and the torque capacity of the engine clutch 17 together. Subsequently, the process proceeds to Step S204, and it is calculated whether the target torque Tm2 falls below a predetermined value Tmx, or not. If it is determined that the target torque Tm2 falls below the predetermined value Tmx in Step S204, because the target torque Tm2 can be output by the motor generator 12, the process proceeds to Step S205, and it is determined that the output torque for performing the cranking travel, that is, the motor torque has a margin. On the other hand, if it is determined that the target torque Tm2 is equal to or more than the predetermined value Tmx in Step S204, because it is difficult to output the target torque Tm2 by the motor generator 12, the process proceeds to Step S206, and it is determined that the output torque for performing the cranking travel, that is, the motor torque has no margin.

[Travel Status Determination]

As illustrated in FIG. 7, in Step S301, it is determined whether a predetermined downward slope is continued over a predetermined time, or not, on the basis of a detection signal of a longitudinal acceleration sensor. If it is determined that the downward slope is continued in Step S301, the process proceeds to Step S302, and it is determined that the travel status of the vehicle is a non-acceleration status where the vehicle is not immediately accelerated. On the other hand, if it is determined that the downward slope is not continued in Step S301, the process proceeds to Step S303, and it is determined whether a predetermined braking operation is continued over a predetermined time, or not, on the basis of a detection signal of the brake sensor 77. If it is determined that the braking operation is continued in Step S303, the process proceeds to Step S302, and it is determined that the travel status of the vehicle is the non-acceleration status.

If it is determined that the braking operation is not continued in Step S303, the process proceeds to Step S304, and it is determined whether a predetermined decelerating state is continued over a predetermined time, or not, on the basis of a detection signal of the vehicle speed sensor 78. If it is determined that the decelerating state is continued in Step S304, the process proceeds to Step S302, and it is determined that the travel status of the vehicle is the non-acceleration status. On the other hand, if it is determined that the decelerating state is not continued in Step S304, the process proceeds to S305, and it is determined whether the predetermined downward slope is continued over the predetermined time, or not, on the basis of image information on a front of the vehicle and map information at a traveling position. If it is determined that the downward slope is continued in Step S305, the process proceeds to Step S302, and it is determined that the travel status of the vehicle is the non-acceleration status.

If it is determined that the downward slope is not continued in Step S305, the process proceeds to Step S306, and it is determined whether a travel environment is to decelerate the vehicle, or not, on the basis of the image information on the front of the vehicle. For example, when a preceding vehicle, a traffic signal indicative of a stop, or a temporary stop line is present within a predetermined distance in front of the vehicle, it is determined that the travel environment is to decelerate the vehicle. If it is determined that the travel environment is to decelerate the vehicle in Step S306, the process proceeds to Step S302, and it is determined that the travel status of the vehicle is the non-acceleration status. On the other hand, if it is determined that the travel environment is not to decelerate the vehicle in Step S306, the process exits from the routine without being determined to be the non-acceleration status.

[Engine Rotation Process During Motor Travel]

Hereinafter, an engine rotation process during the motor travel will be described. As illustrated in FIG. 4, in Step S10, it is determined whether the present travel mode is the motor travel mode, or not. If it is determined that the present travel mode is the motor travel mode in Step S10, since the engine 11 is in the stop state, the process proceeds to Step S11, and the engine rotation determination described above is executed. If it is determined that the engine rotation is necessary in subsequent Step S12, in other words, if it is determined that the engine rotation is necessary from the viewpoints of booster negative pressure ensuring, compressor drive, or engine brake operation, the process proceeds to Step S13, and the above-mentioned margin torque determination of the motor generator 12 is executed. In subsequent Step S14, if it is determined that output torque has a margin, in other words, if it is determined that the cranking travel caused by an increase in the output torque can be performed as described later, the process proceeds to Step S15, and the above-mentioned travel status determination is executed.

If it is determined that the travel mode of the vehicle is the non-acceleration status in subsequent Step S16, because the switching from to the motor travel mode to the cranking travel mode is executed, the continuously variable transmission 16 is controlled to shift up to an acceleration side, that is, a high side in Step S17, and the engine clutch 17 and the lock-up clutch 36 are engaged in Step S18. Further, the process proceeds to Step S19, and the output torque of the motor generator 12 is increased. As described above, the continuously variable transmission 16 is controlled to shift up, and the engine clutch 17 and the lock-up clutch 36 are engaged, and the output torque of the motor generator 12 are increased, to thereby switch the travel mode from the motor travel mode to the cranking travel mode. As described above, with the execution of the cranking travel mode, the engine 11 can be rotated while maintaining the fuel cutoff, and the booster negative pressure ensuring, the compressor drive, or the engine brake operation can be achieved while suppressing the fuel consumption.

Moreover, when the cranking travel mode is executed, since the output torque is increased more than that in the motor travel mode, the engine load during the cranking travel can be absorbed by the motor generator 12. When the cranking travel mode is executed, since the continuously variable transmission 16 is shifted up to the acceleration side, the load torque to be transmitted from the engine 11 to the driving wheels 22 can be reduced. As described above, the output torque is increased or the continuously variable transmission 16 is shifted up, as result of which even when the engine clutch 17 is engaged in the cranking travel mode, the excessive deceleration caused by the engine coupling can be suppressed, and occupant's discomfort can be suppressed. That the continuously variable transmission 16 is shifted up to the acceleration side means a reduction in a gear ratio of the continuously variable transmission 16. The gear ratio means a ratio of an input shaft rotational speed to an output shaft rotational speed of the continuously variable transmission 16.

When the engine 11 is rotated by the cranking travel as described above, the process proceeds to Step S20, and the above-mentioned engine rotation determination is again executed. If it is determined that the engine rotation is necessary, in other words, if it is determined that the engine rotation is necessary from the viewpoints of the booster negative pressure ensuring, the compressor drive, or the engine brake operation in subsequent Step S21, the process proceeds to Step S18, and the cranking travel is continued. On the other hand, if it is determined that the engine rotation is unnecessary, in other words, if it is determined that the engine rotation is unnecessary from the viewpoints of the booster negative pressure ensuring, the compressor drive, or the engine brake operation in Step S21, the process proceeds to Step S22, the engine clutch 17 and the lock-up clutch 36 are disengaged, and the travel mode switches from the cranking travel mode to the motor travel mode.

On the other hand, if it is determined that the output torque has no margin, in other words, if it is determined that the cranking travel caused by an increase in the output torque is difficult in subsequent Step S14, the process proceeds to Step S23, and the fuel is injected from the injector to start the engine 11. If it is determined that the travel status of the vehicle is not the non-acceleration status, in other words, if it is determined that a possibility that the accelerator pedal is depressed by the driver is high, in Step S16, the process proceeds to Step S23, and the fuel is injected from the injector to start the engine 11. When a torque shortage in the cranking travel is assumed on the basis of the use status of the motor generator 12 or the travel status of the vehicle as described above, the engine 11 is started while the engine clutch 17 is disengaged, without switching the travel mode to the cranking travel mode.

As described above, when the engine 11 is rotated by fuel injection, the process proceeds to Step S24, and the above-mentioned engine rotation determination is again executed. If it is determined that the engine rotation is necessary, in other words, if it is determined that the engine rotation is necessary from the viewpoints of the booster negative pressure ensuring, the compressor drive, or the engine brake operation in subsequent Step S25, the process proceeds to Step S23, and the engine rotation caused by the fuel injection is continued. On the other hand, if it is determined that the engine rotation is unnecessary, in other words, if it is determined that the engine rotation is unnecessary from the viewpoints of the booster negative pressure ensuring, the compressor drive, or the engine brake operation in subsequent Step S25, the process proceeds to Step S26, and the engine 11 is stopped by fuel cutoff.

[Switching from Motor Travel to Cranking Travel]

Figure 8:
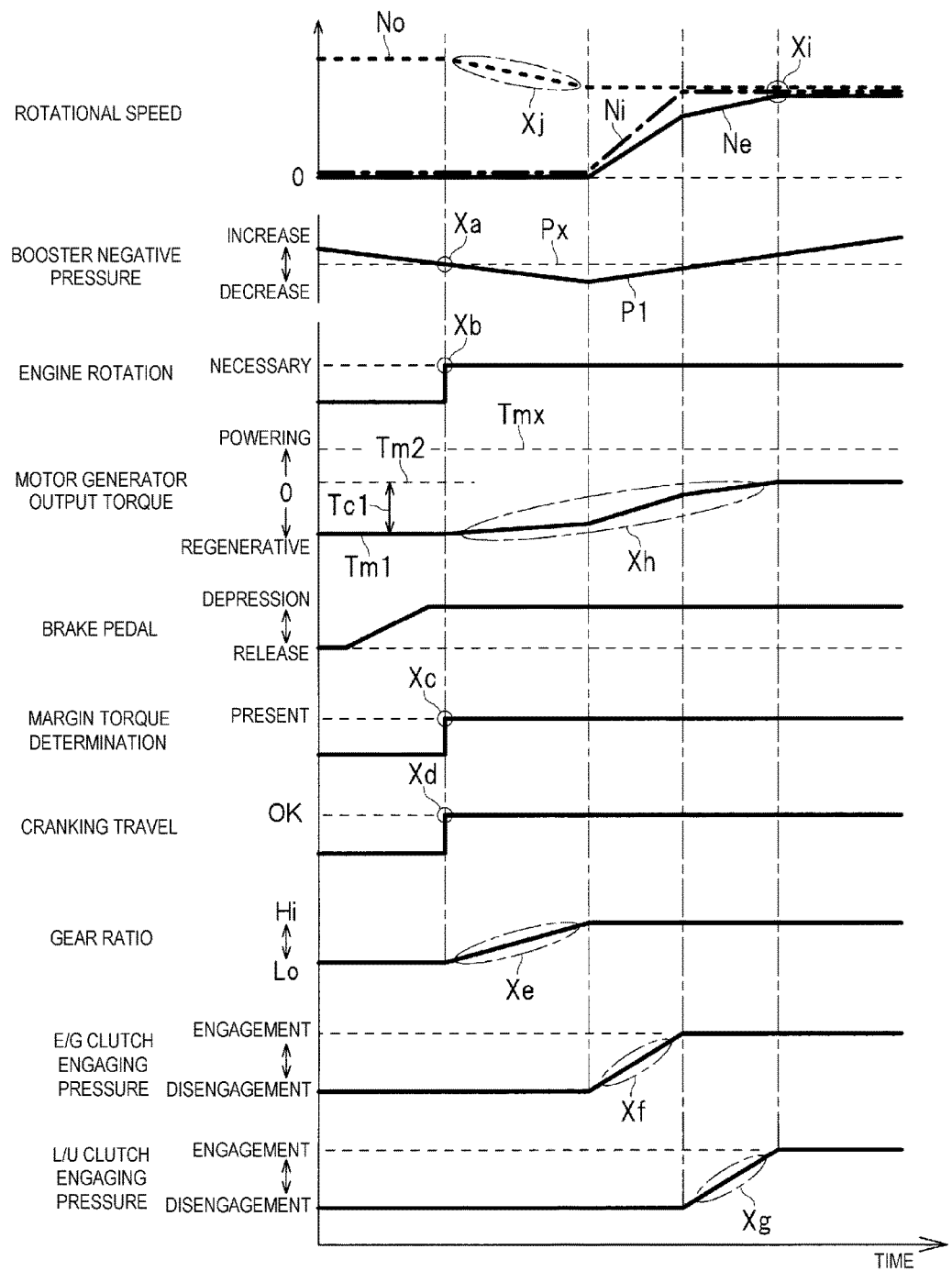
FIG. 8 is a timing chart illustrating an example of a procedure of switching from a motor travel to a cranking travel.

Hereinafter, a procedure for switching from the motor travel to the cranking travel will be described with reference to a timing chart. FIG. 8 is a timing chart illustrating an example of a procedure of switching from the motor travel to the cranking travel. In the travel status illustrated in FIG. 8, the travel mode switches from the motor travel mode to the cranking travel mode while traveling along a downward slope in the motor travel mode. In the rotational speed illustrated in FIG. 8, "Ne" denotes an engine speed. Further, "Ni" is an input rotational speed of the engine clutch 17, in other words, a rotational speed of the turbine shaft 33, and "No" is an output rotational speed of the engine clutch 17, in other words, a rotational speed of the primary shaft 41. In order to facilitate understanding of the drawings, even if the respective rotational speeds Ne, Ni, and No match each other, those speeds are illustrated with a slight deviation. In FIG. 8, the engine clutch 17 is illustrated as an E/G clutch, and the lock-up clutch 36 is illustrated as an L/U clutch.

As illustrated in FIG. 8, the booster negative pressure P1 is decreased with the braking operation, and when the booster negative pressure P1 falls below the predetermined value Px (symbol Xa), it is determined that the engine rotation is necessary for the purpose of ensuring the booster negative pressure P1 (symbol Xb). In order to determine whether the cranking travel is enabled, or not, the margin torque determination of the motor generator 12 is executed. As illustrated in the output torque of FIG. 8, the target torque Tm2 of the motor generator 12 in the cranking travel is calculated by adding the cranking torque Tc1 to the output torque Tm1. If the target torque Tm2 falls below the predetermined value Tmx, it is determined that the output torque has a margin (symbol Xc), and the switching to the cranking travel is permitted (symbol Xd). If the target torque Tm2 exceeds the predetermined value Tmx, it is determined that the output torque has no margin, and the switching to the cranking travel is prohibited.

As described above, when the switching to the cranking travel is permitted, the continuously variable transmission 16 is controlled to shift up to the acceleration side (symbol Xe), the engine clutch 17 is controlled to be engaged (symbol Xf), and the lock-up clutch 36 is controlled to be engaged (symbol Xg). In this situation, for the purpose of suppressing an excessive acceleration change of the vehicle, the output torque Tm1 of the motor generator 12 is increased on the basis of the shifting status of the continuously variable transmission 16, the engaging status of the engine clutch 17, and the engaging status of the lock-up clutch 36 (symbol Xh). When the respective engagements of the engine clutch 17 and the lock-up clutch 36 are completed, and the input rotational speed Ni and the engine speed Ne are converged on the output rotational speed No (symbol Xi), the switching from the motor travel mode to the cranking travel mode is completed.

As described above, when the travel mode switches from the motor travel to the cranking travel, the output torque of the motor generator 12 is increased (symbol Xh). As a result, even when the engine clutch 17 is engaged in association with the switching of the travel mode, the engine load can be absorbed by the motor generator 12, and the excessive deceleration of the vehicle can be suppressed. When the travel mode switches from the motor travel to the cranking travel, the gear ratio of the continuously variable transmission 16 is controlled so as to accelerate (symbol Xe). With this configuration, even when the engine clutch 17 is engaged in association with the switching of the travel mode, the load torque to be transmitted from the engine 11 to the driving wheels 22 can be reduced, and the excessive deceleration of the vehicle can be suppressed.

Moreover, because the gear ratio of the continuously variable transmission 16 is controlled so as to accelerate, thereby being capable of decreasing the output rotational speed No of the engine clutch 17 (symbol Xj), the rotational speed difference before and after the clutch can be reduced. As a result, an engagement time of the engine clutch 17 can be reduced, and the amount of heat generation in the engine clutch 17 can be suppressed. In addition, the gear ratio of the continuously variable transmission 16 is controlled so as to accelerate, thereby being capable of reducing the rotational speed of the motor generator 12, and increasing a maximum torque of the motor generator 12. With that configuration, because the output torque can have a margin, a chance of the cranking travel can be expanded, and the fuel consumption can be suppressed.

The present invention is not limited to the above example, but can be variously changed without departing from the spirit of the present invention. In the above description, the engine controller 70, the hybrid controller 71, and the transmission controller 72 function as the first travel controller and the second travel controller, but are not limited to this configuration, and other controllers may function as the first travel controller and the second travel controller. Alternatively, the first travel controller and the second travel controller may be configured by one controller without using the multiple controllers.

In the above description, the engine clutch 17 and the fuse clutch 55 are hydraulically controlled, but are not limited to those configurations. For example, the engine clutch 17 and the fuse clutch 55 may be each configured by an electromagnetic clutch that is switched between an engaged state and a disengaged state by an electromagnetic force. Further, in the above description, the continuously variable transmission 16 is used as the transmission, but is not limited to this configuration. A parallel shaft type transmission or a planetary gear type transmission may be employed as the transmission. In addition, in the above description, the engine clutch 17 is disposed on the engine 11 side with respect to the continuously variable transmission 16, but is not limited to this configuration. The engine clutch 17 may be disposed on the driving wheels 22 side with respect to the continuously variable transmission 16.

The invention claimed is:

1. A vehicle control apparatus including an engine and an electric motor, the apparatus comprising:
   a clutch that is disposed in a power transmission path configured to couple the engine and driving wheels;
   a first travel controller configured to execute a motor travel in which the driving wheels are driven by the electric motor in a state where the clutch is disengaged to decouple the engine from the driving wheels, and the engine is stopped;
   a second travel controller configured to execute a cranking travel in which the clutch is engaged while a fuel injection of the engine is stopped in a state in which the motor travel is executed, and the engine is rotated during traveling; and
   a motor controller configured to increase an output torque of the electric motor when a travel mode switches from the motor travel to the cranking travel,
   wherein the motor controller calculates a target torque of the electric motor on the basis of the output torque of the electric motor and a torque capacity of the clutch, and
   the second travel controller permits the cranking travel if the target torque falls below a predetermined value, and prohibits the cranking travel if the target torque exceeds the predetermined value.

2. The vehicle control apparatus according to claim 1, further comprising a vacuum booster that is coupled to an intake pipe of the engine.

3. The vehicle control apparatus according to claim 2, further comprising a compressor that is coupled to a crank shaft of the engine.

4. The vehicle control apparatus according to claim 1, further comprising a compressor that is coupled to a crank shaft of the engine.

5. A vehicle control apparatus including an engine and an electric motor, the apparatus comprising:
- a clutch that is disposed in a power transmission path configured to couple the engine and driving wheels;
- a first travel controller configured to execute a motor travel in which the driving wheels are driven by the electric motor in a state where the clutch is disengaged to decouple the engine from the driving wheels, and the engine is stopped;
- a second travel controller configured to execute a cranking travel in which the clutch is engaged while a fuel injection of the engine is stopped in a state in which the motor travel is executed, and the engine is rotated during traveling;
- a motor controller configured to increase an output torque of the electric motor when a travel mode switches from the motor travel to the cranking travel;
- a transmission mechanism that is disposed between the power transmission path configured to couple the engine and the driving wheels; and
- a transmission controller configured to control the transmission mechanism to accelerate when the travel mode switches from the motor travel to the cranking travel.

6. The vehicle control apparatus according to claim 5, further comprising a vacuum booster that is coupled to an intake pipe of the engine.

7. The vehicle control apparatus according to claim 6, further comprising a compressor that is coupled to a crank shaft of the engine.

8. The vehicle control apparatus according to claim 5, further comprising a compressor that is coupled to a crank shaft of the engine.

* * * * *